US011357373B2

(12) United States Patent
Buening et al.

(10) Patent No.: US 11,357,373 B2
(45) Date of Patent: Jun. 14, 2022

(54) SUCTION MATERIAL COLLECTING STATION, SYSTEM MADE FROM A SUCTION MATERIAL COLLECTING STATION AND A SUCTION CLEANER, AND A METHOD FOR THE SAME

(71) Applicant: Vorwerk & Co. Interholding GmbH, Wuppertal (DE)

(72) Inventors: Thomas Buening, Bochum (DE); Benjamin Fleczok, Essen (DE); Robert Frielinghaus, Bochum (DE); Martin Helmich, Duisburg (DE); Lorenz Hillen, Wuppertal (DE); Christian Holz, Dortmund (DE); Gerhard Isenberg, Cologne (DE); Andrej Mosebach, Bochum (DE); Roman Ortmann, Duisburg (DE); Kevin Schmitz, Duesseldorf (DE); Fabian Vitz, Wuppertal (DE); Niklas Van Teeffelen, Duesseldorf (DE); Georg Hackert, Wilen bei Wollerau (CH)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 364 days.

(21) Appl. No.: 16/804,339

(22) Filed: Feb. 28, 2020

(65) Prior Publication Data

US 2020/0281428 A1 Sep. 10, 2020

(30) Foreign Application Priority Data

Mar. 8, 2019 (DE) ...................... 10 2019 105 936.4

(51) Int. Cl.
*A47L 9/14* (2006.01)
*A47L 11/40* (2006.01)
(Continued)

(52) U.S. Cl.
CPC ................. *A47L 9/149* (2013.01); *A47L 9/19* (2013.01); *A47L 9/281* (2013.01); *A47L 9/2873* (2013.01);
(Continued)

(58) Field of Classification Search
CPC ........... A47L 11/4011; A47L 2201/024; A47L 9/106; A47L 9/149; A47L 9/19;
(Continued)

(56) References Cited

U.S. PATENT DOCUMENTS 5,787,545 A * 8/1998 Colens .................. A47L 9/2873
15/340.1
9,462,920 B1 * 10/2016 Morin ................... A47L 9/2842
(Continued)

FOREIGN PATENT DOCUMENTS

JP 2013230294 A * 11/2013

*Primary Examiner* — Marc Carlson
(74) *Attorney, Agent, or Firm* — Collard & Roe, P.C.

(57) ABSTRACT

A suction material collecting station for regenerating a filter chamber of a suction cleaner has an interface for connecting to the suction cleaner, a suction material collection container, a fan for generating a negative pressure in the suction material collection container, and an electric motor for driving the fan so that suction material contained in the filter chamber may be conveyed into the suction material collection container. The suction material collecting station has a control and evaluation unit that calculates a surroundings disturbance parameter and controls the operation of the electric motor automatically, depending on the surroundings disturbance parameter and a device parameter of the suction cleaner. The suction material collecting station has a detection device for detecting a presence parameter in the surroundings of the suction material collecting station and/or a
(Continued)

device parameter, and/or a communication device for receiving information about the presence parameter and/or device parameter.

11 Claims, 2 Drawing Sheets

(51) Int. Cl.
    *A47L 9/19*         (2006.01)
    *A47L 9/28*         (2006.01)
    *B01D 46/00*       (2022.01)
    *B01D 46/70*       (2022.01)

(52) U.S. Cl.
    CPC .......... *A47L 11/4011* (2013.01); *B01D 46/70*
                (2022.01); *A47L 2201/024* (2013.01)

(58) Field of Classification Search
    CPC ...... A47L 9/2805; A47L 9/281; A47L 9/2831;
                    A47L 9/2842; A47L 9/2857; A47L
                    9/2873; A47L 9/2894; B01D 46/70
    See application file for complete search history.

(56) References Cited

U.S. PATENT DOCUMENTS

| | | | |
|---|---|---|---|
| 2014/0207282 A1* | 7/2014 | Angle | G06Q 10/1095 901/1 |
| 2016/0282862 A1* | 9/2016 | Duffley | A47L 11/4011 |
| 2017/0164803 A1* | 6/2017 | Han | B25J 11/0085 |
| 2018/0008111 A1* | 1/2018 | Morin | A47L 9/106 |
| 2021/0331314 A1* | 10/2021 | Chae | B25J 9/0003 |

\* cited by examiner

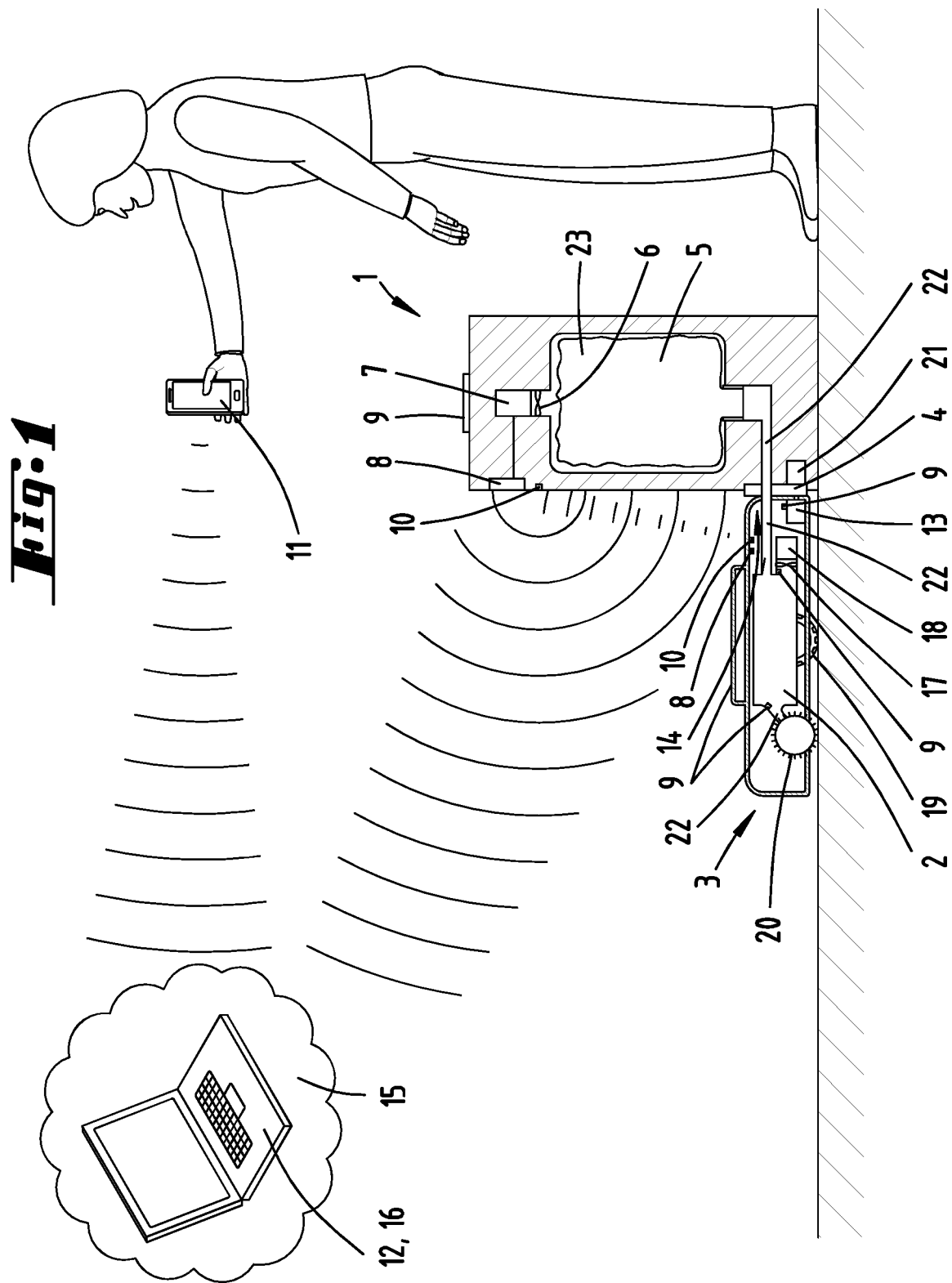

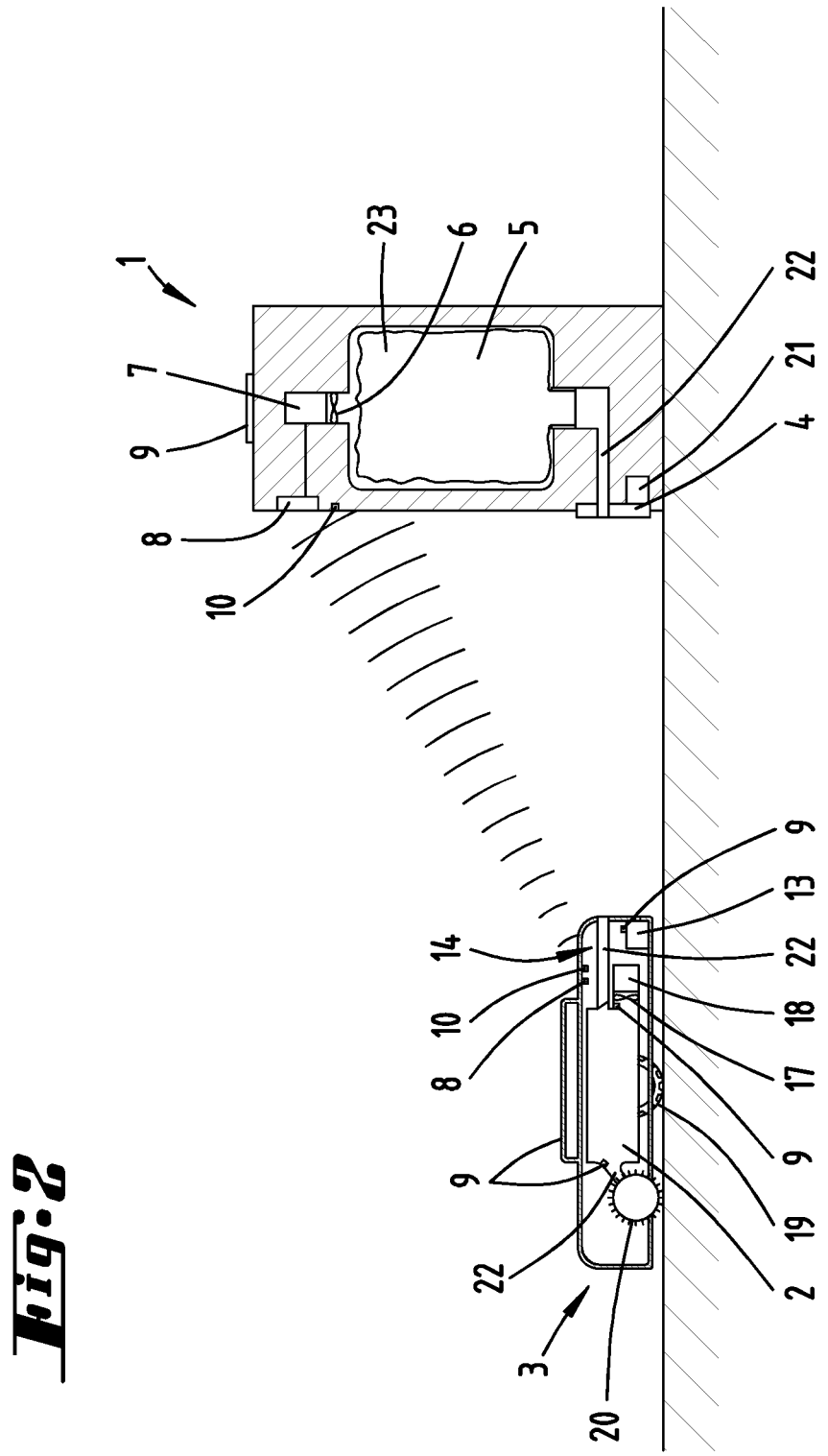

SUCTION MATERIAL COLLECTING STATION, SYSTEM MADE FROM A SUCTION MATERIAL COLLECTING STATION AND A SUCTION CLEANER, AND A METHOD FOR THE SAME

CROSS REFERENCE TO RELATED APPLICATIONS

Applicant claims priority under 35 U.S.C. § 119 of German Application No. 10 2019 105 936.4 filed Mar. 8, 2019, the disclosure of which is incorporated by reference.

BACKGROUND OF THE INVENTION

1. Field of the Invention

The invention initially relates to a suction material collecting station for regenerating a filter chamber of a suction cleaner, wherein the suction material collecting station has an interface for connecting to the suction cleaner, a suction material collection container, a fan for generating a negative pressure in the suction material collection container, and an electric motor for driving the fan, so that suction material contained in the filter chamber of the suction cleaner may be conveyed into the suction material collection container by means of the fan.

The invention further relates to a system made from a suction material collecting station of the previously described type and a suction cleaner, wherein the suction cleaner has a filter chamber for collecting suction material during a suction cleaning operation, and at least one partial area of the device designed to correspond to the interface of the suction material collecting station, by means of which the suction cleaner is connectable to the suction material collecting station for regenerating the filter chamber.

Furthermore, the invention relates to a method for regenerating a filter chamber of a suction cleaner by means of a suction material collecting station, wherein the suction cleaner is connected to an interface of the suction material collecting station and suction material present in the filter chamber is transferred in to a suction material collection container of the suction material collecting station by means of a fan of the suction material collecting station driven by an electric motor.

2. Description of the Related Art

Suction material collecting stations of the previously mentioned type are known in the prior art. For example, these may be designed for dedusting autonomously moving suction cleaners or manually guided suction cleaners.

U.S. Pat. No. 5,787,545 A discloses, for example, a base station for a suction robot, which has a charging unit for charging an accumulator of the suction robot, and also a suction material collection container for transferring suction material from the suction robot. For this purpose, the base station has an interface, to which the suction robot may couple in such a way that a negative pressure, generated by means of a fan of the suction material collecting station, may convey the suction material out of the filter chamber of the suction robot into the suction material collection container of the base station. It is further known that a suction robot of this type may autonomously approach the base station in order to have its filter chamber suctioned out there.

It is disadvantageous that the noise generated during operation of the fan may be disturbing for a user or an animal present in the surroundings of the suction material collecting station.

SUMMARY OF THE INVENTION

Starting from the previously mentioned prior art, it is the object of the invention to refine a suction material collecting station in such a way that a person and/or an animal located in the surroundings of the suction material collecting station does not feel disturbed by the operating of the suction material collecting station.

To solve the previously mentioned problem, it is initially proposed that the suction material collecting station has a control and evaluation unit, which is equipped to calculate a surroundings disturbance parameter, which indicates a degree of potential disturbance of the surroundings due to the operation of the fan of the suction material collecting station, and to automatically control the operation of the electric motor, depending on the surroundings disturbance parameter and a device parameter of the suction cleaner, wherein the suction material collecting station furthermore has a detection device for detecting a presence parameter in the surroundings of the suction material collecting station and/or a device parameter and/or a communication unit for receiving information about the presence parameter and/or device parameter.

According to the invention, the operation of the fan, and thus noise emissions, are controlled depending on detected or received presence and/or device parameters, from which a surroundings disturbance parameter is calculated. The dedusting or emptying of the filter chamber of the suction cleaner, regardless of whether it is a manually operated or autonomous suction cleaner, is thus only carried out if no or only low noise pollution is to be expected in the surroundings due to the operation of the suction material collecting station. In particular, the operation of the electric motor or the fan is controlled, depending on a necessity for regenerating the filter chamber and a current presence of a user or animal in the surroundings of the suction material collecting station. The regeneration of the filter chamber is preferably controlled so that this is then only carried out if an actual, defined requirement exists for this and the operation of the electric motor/fan of the suction material collecting station is as unnoticed as possible and/or carried out particularly quietly. It is thereby essential that the evaluation and control unit of the suction material collecting station controls the operation of the fan, depending on a determined surroundings disturbance parameter, which indicates whether dedusting of the filter chamber is possible without disturbing the surroundings, and depending on a dedusting necessity, i.e., information about whether a dedusting of the filter chamber is absolutely necessary at the present time. The suction material collecting station may detect the presence parameter and/or device parameter itself or by means of its own detection unit, or alternatively receive it/them from an external device via its communication unit. The control and evaluation unit of the suction material collecting station may then take the necessary steps for an immediate or later operation of the fan motor for regenerating the filter chamber of the suction cleaner on the basis of the detected and/or received presence parameter or device parameter.

The suction cleaner may initially dock in the usual way at the suction material collecting station or be connected to the interface by a user. The suction material collecting station then detects, for example, by means of a contact switch, that the suction cleaner is connected to the suction material collecting station. The detection device of the suction material collecting station detects a current presence parameter and a current device parameter or receives these from an external device. The suction material collecting station is thus basically ready to carrying out a dedusting; however, the fan is only started if, on the one hand, there is a necessity for the regeneration, and, on the other hand, a surroundings disturbance parameter, calculated from the presence parameter, allows this.

It is proposed that the detection device of the suction material collecting station has an image capture device, and ultrasonic sensor, a microphone, a radio module, and/or a movement sensor. According to this embodiment, the suction material collecting station itself has one or multiple detection devices for detecting a presence of, for example, a person, an animal, and/or a mobile end device of the user in the surroundings of the suction material collecting station. Furthermore, the detection device may also be designed, for example, to detect a device, for example, another cleaning device, a kitchen appliance, stereo system or the like operating in the surroundings of the suction material collecting station. The image capture device may, for example, be a camera, an optical chip, for example, a CMOS chip or CCD chip. Furthermore, an ultrasonic sensor may detect a device emitting ultrasonic signals in the surroundings of the suction material collecting station. A microphone may perceive perceptible noises from persons, animals, or devices in the surroundings. A radio module may receive radio signals from external devices, which provide an indication that a user of these devices is present in the surroundings. In addition, movement sensors, in particular optical sensors, may also be used to detect movements in the surroundings.

The detection device is designed to detect parameters that provide an indication as to whether a regeneration of the filter chamber is possible without disturbing the surroundings. For this purpose, instead of parameters detected by the suction material collecting station itself, presence parameters may be utilized, which the suction material collecting station receives from other devices. The control and evaluation unit of the suction material collecting station checks, based on these detected parameters, whether, for example, movements and/or noises are present in the surroundings. A presence of a person may, for example, be recognized by the detection of a radio signal emitted by a mobile communication device, which said person generally carries with them. For example, the detection device may detect a radio signal of a mobile phone, and/or a wireless communication within a home network that is active at that time. For example, it may be detected, whether a wireless communication network of a household is used at that time. For example a current Internet use may be determined via a router of the communication network. Furthermore, based on the location function of a mobile communication network, a current location of the user may be established, or it may be at least determined whether the user is currently within the surroundings of the suction material collecting station at that time, for example, is in a certain house, or not. The presence of the user may additionally be determined via an evaluation of a calendar of the user, a movement sensor and/or actuated electric switches in the surroundings. The control and evaluation unit of the suction material collecting station may thus utilize detected presence parameters, which are the result of room monitoring. The control and evaluation unit determines a surroundings disturbance parameter from this, which indicates a probability that a person (or also an animal) might be disturbed in the surroundings of the suction material collecting station by its operation. The suction material collecting station, or an external device in communication connection with it, may have one or more room monitoring units, which are designed, for example, to detect a movement signal within a room, consumption of electricity within a room, and/or an actuation of an electric switch within a room. Operation of the fan of the suction material collecting station may then be avoided or interrupted, if a detection signal suggests the presence of a person and/or an animal in the surroundings of the suction material collecting station. In particular, an activated lighting control, opened windows, the switching on or off of heating or air conditioning, an actuated light switch, the operation status of a music system, a vacuum, a kitchen appliance, a floor processing or monitoring robot, may be detected.

The detection device may have a radio module, as previously mentioned, and also an ultrasonic sensor, which may detect corresponding signals in the surroundings. With respect to the radio module, the detection device may be designed to determine a signal strength of a radio signal of a mobile end device. The radio signal may be, for example, a Bluetooth, WLAN, or GSM signal. The suction material collecting station correspondingly has a Bluetooth, WLAN, or GSM radio reception unit. A device emitting ultrasonic signals may also likewise be detected by means of a corresponding detection device. The ultrasonic signal is not perceptible by a person; however, may function for the control and evaluation unit of the suction material collecting station to detect a presence of a user within the surroundings or to indicate this presence. For example, the suction material collecting station may emit an ultrasonic signal, which is received, for example, by a mobile end device of the user and may be answered. Upon emitting the signal, a timer may be started, which runs until the reception of an answering signal. If the time interval up to the reception of the answering signal lies below a certain time threshold value, then it is assumed that the mobile end device, and thus also the user, are located in the surroundings of the suction material collecting station and the regeneration of the filter chamber is to be avoided. In addition, image capture devices and/or movement sensors of autonomously moving floor-cleaning devices may be utilized to determine a presence parameter. For example, it may be determined by using a so-called simultaneous localization and mapping algorithm (SLAM algorithm), whether changes in distance occur often in the surroundings of the suction material collecting station. This may indicate that moving objects are located in the surroundings. These may be objects carried or moved by the user, or also the user or an animal moving around in the surroundings. If no movement is detected, the control and evaluation unit may decide that no person or animal is present in the surroundings. In this context, it may also be provided, that an autonomously moving device undertakes a specific reconnaissance trip through the surroundings. If the detection device of the suction material collecting station has a microphone, it may additionally be determined whether noises are present in the surroundings. In the case of an acoustic detection, speech recognition may be carried out, which may specifically recognize human speech. In addition, however, simple, general acoustic signals may also be detected.

The control and evaluation unit of the suction material collecting station may additionally also be designed to analyze the type of detected noises, in addition to speech recognition. It may thereby be determined whether the detected noises are speech, music, engine noises, working noises from robots or the like. To detect a presence parameter, a so-called smart watch may additionally be used, which transmits a presence signal on the one hand, yet is also designed, on the other hand, to carry out a sleep logging and/or sleep analysis of a user. Furthermore, a bed of the user may be equipped with sensors which detect a presence of the user in the bed. The sleep activity of the user may be evaluated by the control and evaluation unit, wherein a dedusting of a filter chamber by means of the suction material collecting station is avoided during the presence of or sleep activity of the user.

Furthermore, the suction material collecting station may be designed to access a calendar of a user or to receive information about calendar entries by means of the communication device. The suction material collecting station is thus designed to communicate with an external device that has a calendar of the user stored in a data memory. The control and evaluation unit of the suction material collecting station may then evaluate calendar entries and use the obtained information for chronological planning for operating the suction material collecting station. Planned activities of the user in the calendar indicate the absence of the user in the surroundings of the suction material collecting station, so that an activity of the suction material collecting station may be carried out in the periods of absence. Alternatively to a complete injunction against operation of the suction material collecting station, in all of the previously mentioned embodiments, an operation of the fan may alternatively be provided at a lower power level, whose noise emissions are less than those of the usually used power level of the fan.

It is further proposed that the device parameter of the suction cleaner, evaluated for operating the fan, is a status of the suction cleaner, namely, a fill level of the filter chamber, a charging state of an accumulator of the suction cleaner, a cleaning history, and/or a degree of contamination of the suction cleaner. According to this embodiment, the suction material collecting station is designed to determine a dedusting need of a suction cleaner. For this purpose, an accumulator of the suction cleaner or the suction cleaner having the accumulator may transmit information about a charging state of the accumulator to the suction material collecting station. Furthermore, the suction cleaner may transmit parameters, which indicate a previous intake of suction material into the filter chamber, for example, information about contamination within the suction cleaner and/or within the filter chamber. The control and evaluation unit of the suction material collecting station may check, based on the detected and/or received device parameters, whether a suction material intake was recently carried out by means of the suction cleaner. This may be carried out, on the one hand, based on communication with the suction cleaner and/or the accumulator, or alternatively through detection results of an intrinsic detection device of the suction material collecting station, which may detect corresponding parameters on a suction cleaner connected to the suction material collecting station. In reference to the device parameter, which may be detected by the detection device of the suction material collecting station or is received from an external device by means of the communication device of the suction material collecting station, this is subsequently explained in relation to the likewise proposed method for operating the suction material collecting station. The embodiments correspondingly also apply for the suction material collecting station according to the invention.

Furthermore, a system made from a suction material collecting station and a suction cleaner is also initially described with the invention, wherein the suction material collecting station is designed according to one of the previously described embodiments, and wherein the suction cleaner has a filter chamber for collection of suction material during a suction cleaning operation and at least one device partial area designed corresponding to the interface of the suction material collecting station, by means of which the suction cleaner is connectable to the suction material collecting station for regenerating the filter chamber. The advantages and features, previously described in relation to the suction material collecting station according to the invention, correspondingly also apply for the system having such a suction material collecting station.

In particular, it is proposed that the suction material collecting station and the suction cleaner have corresponding communication devices. According to this embodiment, presence parameters and/or device parameters may be transmitted, preferably by means of wireless communication, from the suction cleaner to the suction material collecting station or may be called up by the suction material collecting station from the suction cleaner. The corresponding communication devices may be, for example, Bluetooth modules, WLAN modules or other modules.

It is furthermore proposed that the system has a wireless communication network with an access point, wherein the communication devices of the suction material collecting station and the suction cleaner are designed to communicate with the access point. This embodiment is particularly advantageous, as other devices may additionally be linked into the wireless communication network of the system in order to communicate with the suction material collecting station and/or the suction cleaner via the access point. Other devices may be, for example, other suction material collecting stations, suction cleaners, monitoring devices, detection devices, memory devices or the like. According to this embodiment, the suction cleaner or the other devices and the suction material collecting station do not communicate directly with one another, but instead via the access point of the communication network. However, it may also be provided that these may additionally, alternatively also communicate directly with one another. A memory device of the communication network, to which both the suction material collecting station and the suction cleaner or one or more previously-mentioned other external devices transmit data or may call up data from the same, may be assigned to the access point. It is thus possible to constantly provide current information about presence parameters and/or device parameters to the participants in the communication network, in particular to the suction material collecting station or its control and evaluation unit.

In particular, it is proposed that the system has at least one other device linked into the communication network having a corresponding communication device, wherein the device is selected and/or is equipped with a device from the group: data memory device, accumulator for the suction cleaner, movement sensor, image capture device, ultrasonic sensor, microphone, radio module, household appliance, entertainment device, remote control device. According to this embodiment, it is not necessary that the suction material collecting station has an intrinsic detection device for detection a presence parameter and/or device parameter. Instead, the suction material collecting station accesses data of an external device, which detects and/or uses and/or stores information about corresponding parameters. According to this embodiment, a mobile end device and/or another external device may, in particular, have a remote control device, with the aid of which a user may allow or pre-book the operation of the fan. According to one embodiment, the logic for controlling the fan may alternatively be designed, for example, within a suction cleaner having a filter chamber to be regenerated. Furthermore, the logic may be assigned to an accumulator of the suction cleaner or also to a data memory device of the communication network, for example, to a control and evaluation unit of an external memory, in particular also a so-called cloud. It is then determined within the external evaluation unit whether it is logical to carry out a dedusting of the filter chamber of the suction cleaner by means of the suction material collecting station. According to one particular embodiment, a control command for the fan of the suction material collecting station may be transmitted to the communication device of the suction material collecting station. The suction material collecting station then only has to provide the fan for dedusting the filter chamber. According to this embodiment, an intrinsic control and evaluation unit of the suction cleaner may determine if a suction operation has taken place since the last regeneration process. Information about the device parameter may then be transmitted to the suction material collecting station, which then carries out and/or postpones a regeneration. In particular, the system according to the invention is also designed to carry out a method of the subsequently described type, wherein the advantages and features regarding this also correspondingly apply for the system according to the invention.

Furthermore, a method for regenerating a filter chamber of a suction cleaner by means of a suction material collecting station is proposed with the invention, wherein the suction cleaner is connected to an interface of the suction material collecting station, and suction material present in the filter chamber is transferred into a suction material collection container of the suction material collecting station by means of a fan of the suction material collecting station driven by an electric motor, wherein a control and evaluation unit calculates a surroundings disturbance parameter that indicates a degree of potential disturbance of the surroundings due to operating the fan of the suction material collecting station, and which controls the operation of the electric motor automatically, depending on the surroundings disturbance parameter and a device parameter of the suction cleaner and, wherein a detection device of the suction material collecting station detects a presence parameter in the surroundings of the suction material collecting station and/or a device parameter, and/or a communication device of the suction material collecting station receives information about the presence parameter and/or device parameter. As already previously described in relation to the suction material collecting station according to the invention or the system according to the invention, the suction material collecting station may itself detect a presence parameter by means of an intrinsic detection device, namely the presence of people, animals, or devices, whose operation indicates the presence of a person. The control and evaluation unit calculates a surroundings disturbance parameter from this, which is a measure for whether a person and/or animal in the surroundings might feel disturbed by the suction material collecting station. If it is determined, that, for example, a person is located in the surroundings of the suction material collecting station, then a regeneration of a filter chamber may be avoided or at least carried out, for example, at a relatively low output of the electric motor, so that noises generated during the regeneration of the filter chamber may not be perceived as disturbing. In addition, the operation of the fan may also be made dependent on one or more device parameters of the suction cleaner, which provide an indication as to whether an immediate regeneration of the filter chamber is necessary. If it is determined that a necessity does not exist, as the filter chamber is, for example, only filled with a very low amount of suction material, it may be provided to postpone the regeneration, in particular if it has been determined by means of a detection device that a person is located at that time in the surroundings of the suction material collecting station and might be disturbed.

Alternatively to an intrinsic detection activity of the suction material collecting station, it may also be provided that the suction material collecting station receives presence parameters and/or device parameters from another device. For this purpose, the suction material collecting station has a communication device, which, for example, may receive information from suction cleaners in the surroundings, other suction material collecting stations, or also other devices. The presence parameters and/or device parameters detected by other devices may likewise be evaluated in order to determine whether a person or animal is located at that time in the surroundings of the suction material collecting station, or whether a device parameter of a suction cleaner connected to the suction material collecting station is actually to be regenerated.

In particular, it is proposed that the detection device of the suction material collecting station detects a presence of a person, an animal, and/or a device operated in the surroundings as the presence parameter, and/or that the detection device detects a status of the suction cleaner, namely a fill level of the filter chamber, a charging state of an accumulator, a cleaning history, and/or a degree of contamination of the suction cleaner as the device parameter.

Alternatively, it may additionally be provided that a detection device of the suction cleaner of a device operated in the surroundings detects a presence of a person, an animal, and/or a device operated in the surroundings as the presence parameter, and/or that the detection device detects a status of the suction cleaner, namely a fill level of the filter chamber, a charging state of an accumulator, a cleaning history, and/or a degree of contamination of the suction cleaner as the device parameter, wherein a communication device of the suction cleaner or of the device transmits information about the presence parameter and/or device parameter to the suction material collecting station, and wherein an operation of the fan of the suction material collecting station is automatically controlled depending on the presence parameter and/or the device parameter. In this variant, the suction material collecting station does not itself have to have a detection device for detecting a presence parameter and/or device parameter. Instead, the suction material collecting station receives information about these types of parameters from a suction cleaner or another external device, for example, a monitoring robot, a mobile end device of a user, or the like. The communication between the corresponding communication devices of the suction material collecting station and the suction cleaner or the external device is preferably carried out within a wireless communication network, for example, a WLAN network. Multiple suction cleaners or external devices may particularly preferably transmit presence parameters, for example, to a central memory device of the communication network, so that a control and evaluation unit of the suction material collecting station may constantly obtain knowledge about whether, for example, a person is located in the vicinity of the suction material collecting station and might be disturbed by regeneration noises. The control and evaluation unit may then determine the characteristic surroundings disturbance parameter from this.

With respect to detecting a device parameter of a suction cleaner, it may be provided that the suction material collecting station initially detects when or if a suction cleaner is connected to the interface of the suction material collecting station. To that end, the suction material collecting station checks whether a suction cleaning has been recently carried out with the suction cleaner, in particular since the last regeneration of the suction cleaner. The suction material collecting station may communicate, preferably wirelessly, for this purpose with the suction cleaner, in particular also with its accumulator. The suction cleaner or the accumulator then transmits, for example, information to the suction material collecting station with the content, that a suction operation of the suction cleaner has taken place since the last dedusting. This information is compared with the time of the last known dedusting of the suction cleaner. If the new suction operation is after this time, then the control and evaluation unit of the suction material collecting station determines that a suction operation has taken place since the last regeneration of the filter chamber and thus suction material is presumably located within the filter chamber. Consequently, the control and evaluation unit of the suction material collecting station may initiate a regeneration of the filter chamber, namely in particular by operating the electric motor of the fan. Furthermore, the control and evaluation unit of the suction material collecting station may use additional information in order to make a decision about operating the electric motor. The device parameter may relate to a status of the cleaner, which is detected, for example, by a dirt sensor within the suction cleaner or a filter fill level sensor of the suction cleaner. The dirt sensor recognizes during use that dust and/or dirt is suctioned up, and optionally the amount and/or type of the suction material that is suctioned up. This information is stored in the suction cleaner and transmitted wirelessly or by wire to the control and evaluation unit of the suction material collecting station at the time of the connection of the suction cleaner to the suction material collecting station. Alternatively, the suction cleaner may store and/or transmit the information continuously or at certain intervals to the suction material collecting station. The control and evaluation unit of the suction material collecting station may determine, based on a comparison with threshold values, whether there exists a necessity at that time for immediate regeneration of the filter chamber of the suction cleaner, or whether the regeneration may optionally be postponed chronologically into the future, in particular if a presence parameter indicates that a person and/or an animal within the surroundings of the suction material collecting station might feel disturbed by the regeneration. After a successful dedusting of the filter chamber, the status of the suction cleaner may be reset again to "regenerated". The fill level of the filter chamber may be determined, for example, via a differential pressure sensor or another fill level sensor. The fill level sensor may detect, for example, a cumulative accumulation of suction material, have a light barrier, be an optical or acoustic sensor, an electrostatic induction sensor for detecting a particle speed or the like.

In order to check whether the suction cleaner has accumulated new suction material after the last regeneration was carried out, an operating history of the suction cleaner may be evaluated. The on/off states of the suction cleaner and also a duration of a suction operation and/or a suction output of the fan may thereby be evaluated. If it is determined that a suction operation was carried out by means of the suction cleaner after the last regeneration, the control and evaluation unit of the suction material collecting station may regenerate the filter chamber of the suction cleaner in the case of a low surroundings disturbance parameter. The cleaning history may be determined indirectly via a discharge of the accumulator of the suction cleaner. One or multiple parameters of the accumulator may thereby be utilized and transmitted to the control and evaluation unit of the suction material collecting station. The transmission of these device parameters may be carried out either initially upon docking the suction cleaner at the interface of the suction material collecting station, or also already previously by means of wireless communication via corresponding communication devices of the suction material collecting station and the suction cleaner, optionally with the intermediary of an access point of a wireless communication network, in particular of a smart home network. The control and evaluation unit of the suction material collecting station may compare the transmitted device parameters with reference values, in particular stored in the suction material collecting station. If a deviation results, the control and evaluation unit may decide whether a regeneration operation is to be carried out. In particular, the control and evaluation unit may determine a charge state of the accumulator of the suction cleaner. For this purpose, the suction cleaner has, for example a Coulomb counter of carries out a charge state comparison. The charge status is then transmitted to the control and evaluation unit of the suction material collecting station. Furthermore, the suction cleaner may have a temperature sensor which measures a temperature of the accumulator. If the temperature is increased, it may be concluded, for example, that a discharge of the accumulator occurred when carrying out a suction operation. The control and evaluation unit of the suction material collecting station may then decide, upon receiving this device parameter, whether the filter chamber is to be suctioned out.

Furthermore, the suction cleaner may determine the voltage of the accumulator and compare this with reference values. In particular, an accumulator voltage before a suction operation may be compared with an accumulator voltage after a suction operation, in order to determine whether a suction operation has been carried out. This device parameter may be determined either by an intrinsic detection device of the suction cleaner or by a detection device of the suction material collecting station, which, for example, measures an accumulator voltage at the charge/discharge contacts of the suction cleaner when the suction cleaner is connected to the interface of the suction material collecting station. In this case, a wireless communication no longer has to be carried out between the suction cleaner and the suction material collecting station. If a system is used that contains a suction cleaner with multiple accumulators, then the possibility exists that a first cleaning was carried out with a first accumulator, and a subsequent cleaning used a second accumulator. In this case, the amount, by which the charge status of all accumulators has been reduced over all, may be determined following the conclusion of the cleaning operation of the suction cleaner. For this purpose, the suction cleaner and all additional accumulators of the system, for example, may be connected to the suction material collecting station. If the sum of the charge state of the accumulators is less than a defined threshold value, then the control and evaluation unit of the suction material collecting station may decide whether the affected suction cleaner was previously operated and its filter chamber is now to be dedusted. In addition to the charge states of the accumulators, their associated accumulator IDs, for example, may additionally be transmitted to the suction material collecting station. This is particularly advantageous if the system contains multiple accumulators for a suction cleaner. A time stamp may also be optionally transmitted as well, in order to facilitate a chronological assignment of the device parameter.

Furthermore, the operation of the electric motor of the suction material collecting station may finally also be released by a user, for example, via an external end device, which is in communicative connection with the suction material collecting station, optionally via an access point of a communication network. The user has, for this purpose, for example, a mobile end device, like a mobile telephone or a tablet computer, on which a application is installed for the remote control of the suction material collecting station. This application may display, for example, current device parameters of the suction cleaner and/or the suction material collecting station to the user. This includes information as to whether a suction cleaner is currently connected to the interface of the suction material collecting station, whether the suction material collecting station is connected to a household electrical network, whether the control and evaluation unit of the suction material collecting station currently recommends a regeneration of the filter chamber of a suction cleaner, which cleaning parameters are recommended, for example, suction power of the fan of the suction material collecting station or regeneration duration, when a regeneration of the filter chamber was last carried out, what fill level the filter chamber of suction cleaner and/or the suction material collection container of the suction material collecting station has. The user may then, for example, follow a regeneration recommendation of the control and evaluation unit of the suction material collecting station in the application. Furthermore, it is possible that the user indicates a time window, in which the regeneration is desired. The user may start a timer for the operation of the electric motor of the suction material collecting station, so that a regeneration process is initiated after the expiration of the set time period. The user may additionally create a calendar in the suction material collecting station or also in an external end device in communication connection with the same, in particular a data memory device, said calendar containing night time quiet periods, midday quiet periods, holiday times, absence times of the user, or the like. Operation of the electric motor of the suction material collecting station may then be postponed if the control and evaluation unit of the suction material collecting station detects that at that time, for example, a quiet period is present. Only after the expiration of the quiet period is the electric motor switched on to operate the fan of the suction material collecting station.

As a whole, the system, made from the suction material collecting station and suction cleaner, may be configured in such a way that the scope of the automatic operation of the electric motor of the suction material collecting station is variable, depending on one or multiple presence parameters and/or one or multiple device parameters. The control and evaluation unit of the suction material collecting station may define whether and when the regeneration of the filter chamber is started, based on parameters, either detected intrinsically or determined by external devices, in particular suction cleaners. Furthermore, a manual release may be provided by a user for the final release of the operation of the fan of the suction material collecting station, which may be carried out, in particular, in the scope of a remote control of the regeneration.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows a system with a suction material collecting station and a suction cleaner according to one exemplary embodiment; and FIG. 2 shows a system with a suction material collecting station and a suction cleaner according to another exemplary embodiment.

DETAILED DESCRIPTION OF PREFERRED EMBODIMENTS

FIG. 1 shows by way of example one possible embodiment of a system according to the invention made from a suction material collecting station 1 depicted by way of example and a suction cleaner 3 depicted by way of example. Suction material collecting station 1 functions here as a docking station for suction cleaner 3, which is designed here by way of example as an autonomously moving robot. However, the invention may likewise have meaning for a system, which has a suction material collecting station 1 and a suction cleaner 3 manually guided by a user, which is manually connected by the user to suction material collecting station 1.

When viewed from the outside, suction material collecting station 1 has a station housing with an interface 4 for contacting suction cleaner 3. Suction material collecting station 1 has a suction material collection container 5 for acquiring suction material from suction cleaner 3, a fan 6, and an electric motor 7, which functions for driving fan 6. In the area of interface 4, suction material collecting station 1 has a flow channel 22 which connects interface 4 to suction material collection container 5. When operating electric motor 7, and thus fan 6, suction material may flow into suction material collection container 5 via interface 4 and through flow channel 22, wherein the suction material is retained there by a filter element 23, for example, a filter bag, so that exclusively cleaned air flows farther to fan 6 or electric motor 7. Suction material collecting station 1 furthermore has a charging device 21 for charging an accumulator 13 of suction cleaner 3. Furthermore, suction material collecting station 1 has a communication device 10, in this case, for example, a WLAN module, for wireless communication with suction cleaner 3 and a communication network 15, and a control and evaluation unit 8. In addition, suction material collecting station 1 has a detection device 9 for detecting the presence of a user in the surroundings of suction material collecting station 1. This detection device 9 is here, for example, a laser triangulation device, rotatable about 360 degrees, which may measure distances to obstacles or objects in the surroundings of suction material collecting station 1. If, as depicted, a user passes through the light barrier thus formed, detection device 9 detects the varying distances to obstacles in short time intervals, whereby control and evaluation unit 8 of suction material collecting station 1 may then infer a moving obstacle, as here, by way of example, a user.

Communication network 15 has a plurality of participants, including, according to the exemplary embodiment here, on the one hand suction material collecting station 1 or its communication device 10, a mobile end device 11 of the user, who carries it with them, and an external device 12 which simultaneously forms access point 16 for communication network 15. Communication network 15 is, for example, a so-called smart home network, into which additional participants (not depicted here) may be linked, for example, a heating control, lighting control, room monitoring, and automated door closing system, or the like. The participants of communication network 15 may either directly communicate with one another here, or may communicate via access point 16 of communication network 15.

Suction cleaner 3 has a filter chamber 2, a device fan 17, and a device motor 18. Device motor 18 functions for driving device fan 17 in order to be able to suction suction material from a surface to be cleaned into filter chamber 2 during a conventional suction operation of suction cleaner 3. The suction material is collected in filter chamber 2, so that exclusively cleaned air may flow farther to device fan 17 or to device motor 18. Suction cleaner 3 furthermore has wheel 19 for locomotion of suction cleaner 3 within the surroundings, and a cleaning element 20, for example, a driven brush roller, to act on a surface to be cleaned. Furthermore, a flow channel 22 terminates in the area of cleaning element 20, through which flow channel the suction material may be conveyed from the surface to be cleaned into filter chamber 2. Accumulator 13 of suction cleaner 3 functions for energy supply of device motor 18 and, optionally, additional electronic or electric devices of suction cleaner 3. In addition, suction cleaner 3 has a control and evaluation unit 8 and a communication device 10, which is designed here, for example, likewise as a WLAN module, and thus may correspond to either access point 16 of communication network 15 or directly to communication device 10 of suction material collecting station 1. Suction cleaner 3 further uses a navigation device, which is not depicted here in greater detail. This functions for orientation and self-localization of suction cleaner 3 within the surroundings in order to enable autonomous operation of suction cleaner 3.

Control and evaluation unit 8 of suction material collecting station 1 is designed here so that this controls the operation of electric motor 7 of fan 6 so that a user, who is present in the surroundings of suction material collecting station 1, is disturbed as little as possible or absolutely not at all. Instead of human beings, the same may also apply for animals, which, for example, have sleeping places in the vicinity of suction material collecting station 1.

According to the invention, suction cleaner 3 initially carries out a conventional suction operation, for example, wherein suction cleaner 3 travels autonomously over a surface to be cleaned and accumulates suction material in its filter chamber 2. Electric motor 7, used to drive fan 6, thereby consumes electrical energy, which is removed from accumulator 13. After carrying out a suction cleaning operation, a service requirement may exist for suction cleaner 3, namely, for example, the necessity of emptying filter chamber 2 or charging accumulator 13. To empty filter chamber 2, suction cleaner 3 travels to suction material collecting station 1 and docks there with a device partial area 14 at interface 4 of suction material collecting station 1. On the one hand, flow channels 22 of suction cleaner 3 and of suction material collecting station 1 are thereby connected to one another, and on the other hand, accumulator 13 is connected to charging device 21 of suction material collecting station 1. Interface 4 may have sensors, for example, contact switches, which report the docking of suction cleaner 3 to control and evaluation unit 8 of suction material collecting station 1. As soon as control and evaluation unit 8 has knowledge that a suction cleaner 3 is connected to interface 4, control and evaluation unit 8 determines whether an operation of fan 6 is possible without disturbing a human or animal in the surroundings. Detection device 9 may have already been previously active to regularly detect movements inside of the surroundings, or only activated by control and evaluation unit 8 of suction material collecting station 1 when the docking of suction cleaner 3 is determined. In addition to optical detection device 9 (or also alternatively thereto), suction material collecting station 1 may use additional devices in order to be able to infer the presence of a user. On the one hand, communication device 10 may detect whether an electronic device of the user is operated at that time, for example, mobile end device 11 of the user. Mobile end device 11 itself has a radio module, which transmits signals into the surroundings. If it is determined that mobile end device 11 is located in the surroundings of suction material collecting station 1, control and evaluation unit 8 of suction material collecting station 1 may infer, for example, that the user is at home.

A presence of a user may furthermore be detected by other types of detection devices 9, which are not depicted here in greater detail. For example, detection device 9 of suction material collecting station 1 may also be an image capture device, for example a camera, a CMOS chip, a CCD chip or the like. Detection device 9 may also have an ultrasonic sensor, a microphone for detecting surroundings noises, or the like. For example, it is possible that the user operates another electric or electronic device 12 in the surroundings, which indicates that the user must correspondingly be at home. Other device 12 may be, for example, another household appliance, access point 16, which currently shows an activity on the Internet, a music system of the like. Furthermore, control and evaluation unit 8 may also, via communication device 10 of suction material collecting station 1, access a server of household communication network 15, for example, device 12 designed here as a PC, in which an activity calendar of the user is stored. This calendar may likewise also be located on mobile end device 11 of the user, which control and evaluation unit 8 of suction material collecting station may access directly or indirectly via access point 16. The calendar may contain times of presence and absence of the user, or even more in-depth details, like a nightly rest or afternoon nap, which the user usually observes. Depending on the information collected, control and evaluation unit 8 may then calculate a surroundings disturbance parameter and decide whether electric motor 7 and fan 6 of suction material collecting station 1 may be operated. If, for example, it is determined that a rest period of the user is currently observed, in which the surroundings disturbance parameter is high, for example, "level 10 of 10" or "100 percent", then electric motor 7 is not activated by control and evaluation unit 8.

Scenarios with defined presence parameters may be stored, for example, which are assigned to defined surroundings disturbance parameters. Control and evaluation unit 8 determines which presence parameters apply and compares these with the stored scenarios, in order to determine the characteristic surroundings disturbance parameter for them. This may also include the calculation of a probability that the surroundings will probably be disturbed in the case of the detected presence parameters. Control and evaluation unit 8 may use a timer, which automatically starts electric motor 7 of fan 6 after the expiration of the rest period. If noises of the user or, for example, the activity of a music system is detected in the surroundings, control and evaluation unit 8 may likewise cease operation of electric motor 7, or a very low output level may be provided for fan 6 in order to cause as few disturbing noises as possible. If, however, it is determined that the user is indeed present; however other devices emitting noises are currently being operated, for example, a kitchen appliance or another floor processing device, then it may be assumed that the user will not feel disturbed by the operation of suction material collecting station 1. In this case, fan 6 of suction material collecting station 1 may then be switched on in order to empty filter chamber 2 of suction cleaner 3.

FIG. 2 shows another possible embodiment, which, as in FIG. 1, is to be understood as only exemplary, as a plurality of other possibilities exist for carrying out the invention. In particular, a combination of the embodiments according to FIG. 1 and FIG. 2 is also possible. FIG. 2 shows a suction cleaner 3 and a suction material collecting station 1 in a state in which these are not yet connected to one another via interface 4 of suction material collecting station 1. Suction cleaner 3 still travels in the surroundings and carries out a cleaning activity. Suction material is thereby accumulated in filter chamber 2 in the usual way. Suction cleaner 3 has a detection device 9, which comprises two pressure sensors, of which a first pressure sensor is arranged in flow channel 22 upstream of filter chamber 2, and a second pressure sensor is correspondingly arranged downstream of filter chamber 2. Due to detection device 9, a pressure drop across filter chamber 2 may thus be determined, which increases with increased suction material occupation of filter chamber 2.

Suction cleaner 3 has a control and evaluation unit 8 and a communication device 10, by means of which the detection result may be reported to control and evaluation unit 8 of suction material collecting station 1 in order to indicate a need for a regeneration of filter chamber 2. Furthermore, suction cleaner 3 has an additional detection device 9, assigned to accumulator 13, which measures an accumulator voltage, which decreases over the course of an operation of electric motor 7 of suction cleaner 3. According to this embodiment, suction cleaner 3 itself determines, by means of its control and evaluation unit 8 and detection devices 9, one or multiple device parameters of suction cleaner 3. The device parameters are transmitted to suction material collecting station 1, either directly via communication device 10, or also indirectly—as previously depicted by way of example in FIG. 1—via an access point 16 of a communication network 15, into which both suction cleaner 3 and suction material collecting station 1 are linked. Control and evaluation unit 8 of suction material collecting station 1 then decides, based on the device parameters transmitted by suction cleaner 3, whether a dedusting of filter chamber 2 is actually necessary. The decision is thereby made about a necessity of the regeneration process, and also about a possible user disturbance. Therefore, as already described with reference to FIG. 1, a surroundings disturbance parameter is determined. If it is determined, based on the reduced accumulator voltage of accumulator 13 and/or based on the fill level of filter chamber 2, that an urgent regeneration of filter chamber 2 of suction cleaner 3 is necessary, then control and evaluation unit 8 of suction material collecting station 1 checks whether the determined surroundings disturbance parameter is lower than a defined reference parameter. In addition to or alternatively to detection device 9, which is arranged on the upper side of suction cleaner 3 and scans the surroundings in a 360 angle for moving obstacles, suction cleaner 3 may also have other detection devices 9, which may determine a presence parameter, for example, an image capture device, an ultrasonic sensor, a microphone, a movement sensor, a radio module for detecting a mobile end device 11 of the user in the surroundings, or the like. If suction material collecting station 1 then determines or receives the information that the user is most probably not present, or will most probably not feel disturbed, suction material collecting station 1 expects the docking of suction cleaner 3 at interface 4 of suction material collecting station 1 and controls the operation of fan 6 of suction material collecting station 1 for a regeneration of filter chamber 2 of suction cleaner 3.

Although only a few embodiments of the present invention have been shown and described, it is to be understood that many changes and modifications may be made thereunto without departing from the spirit and scope of the invention.

LIST OF REFERENCE NUMERALS

1 Suction material collecting station
2 Filter chamber
3 Suction cleaner
4 Interface
5 Suction material collection container
6 Fan
7 Electric motor
8 Control and evaluation unit
9 Detection device
10 Communication device
11 Device
12 Device
13 Accumulator
14 Device partial area
15 Communication network
16 Access point
17 Device fan
18 Device motor
19 Wheel
20 Cleaning element
21 Charging device
22 Flow channel
23 Filter element

What is claimed is:

1. A suction material collecting station for regenerating a filter chamber of a suction cleaner, comprising:
    an interface configured for connecting to the suction cleaner,
    a suction material collection container,
    a fan configured for generating a negative pressure in the suction material collection container,
    an electric motor configured for driving the fan so that suction material contained in the filter chamber of the suction cleaner may be conveyed by the fan into the suction material collection container,
    a control and evaluation unit which is equipped to calculate a surroundings disturbance parameter, which indicates a degree of potential disturbance of the surroundings by an operation of the fan of the suction material collecting station, and to control the operation of the electric motor automatically, depending on the surroundings disturbance parameter and a device parameter of the suction cleaner, and
    a detection device configured for detecting a presence parameter in the surroundings of the suction material collecting station or a device parameter, and
    a communication device for receiving information about the presence parameter or device parameter.

2. The suction material collecting station according to claim 1, wherein the detection device has at least one of an image capture device, an ultrasonic sensor, a microphone, a radio module, or a movement sensor.

3. The suction material collecting station according to claim 1, wherein the presence parameter is the presence of a person, an animal, or a device operated in the surroundings.

4. The suction material collecting station according to claim 1, wherein the device parameter is a status of the suction cleaner in the form of a fill level of the filter chamber, a charge status of an accumulator, a cleaning history, or a degree of contamination of the suction cleaner.

5. A system made from a suction material collecting station designed according to claim 1 and a suction cleaner, wherein the suction cleaner has a filter chamber for collecting suction material during a suction cleaning operation and at least one device partial area corresponding to the interface of the suction material collecting station so as to connect the suction cleaner to the suction material collecting station to regenerate the filter chamber.

6. The system according to claim 5, wherein the suction material collecting station and the suction cleaner have communication devices corresponding to one another.

7. The system according to claim 6, wherein the system further comprises a wireless communication network with an access point, wherein the communication devices of the suction material collecting station and the suction cleaner are designed to communicate with the access point.

8. The system according to claim 7, further comprising at least one additional device linked into the communication network with a corresponding communication device, wherein the additional device is selected from or equipped with a device from the group consisting of: data memory device, accumulator for the suction cleaner, movement sensor, image capture device, ultrasonic sensor, microphone, radio module, household appliance, entertainment device, and remote control device.

9. A method for regenerating a filter chamber of a suction cleaner by means of a suction material collecting station, wherein the suction cleaner is connected to an interface of the suction material collecting station, the method comprising:
transferring suction material present in the filter chamber into a suction material collection container of the suction material collecting station by means of a fan of the suction material collecting station driven by an electric motor,
calculating with a control and evaluation unit a surroundings disturbance parameter that indicates a degree of potential disturbance of the surroundings by operating the fan of the suction material collecting station,
automatically controlling with the control and evaluation unit the operation of the electric motor, depending on the surroundings disturbance parameter and a device parameter of the suction cleaner, and
detecting with a detection device of the suction material collecting station a presence parameter in the surroundings of the suction material collecting station or a device parameter, and
receiving with a communication device of the suction material collecting station information about the presence parameter and/or device parameter.

10. The method according to claim 9, wherein the detection device of the suction material collecting station detects a presence of a person, an animal, or a device operated in the surroundings as the presence parameter, or wherein the detection device detects a status of the suction cleaner in the form of a fill level of the filter chamber, a charge status of an accumulator, a cleaning history, or a contamination state of the suction cleaner as a device parameter.

11. The method according to claim 9, wherein the detection device of the suction cleaner, or of an additional device operated in the surroundings, detects a presence of a person, an animal, or a device operated in the surroundings as the presence parameter, or wherein the detection device detects a status of the suction cleaner in the form of a fill level of the filter chamber, a charge status of an accumulator, a cleaning history, or a contamination state of the suction cleaner as a device parameter, wherein the communication device of the suction cleaner or of the additional device transmits information about the presence parameter or device parameter to the suction material collecting station, and wherein an operation of the fan of the suction material collecting station is controlled automatically, depending on the presence parameter or the device parameter.

* * * * *